Figure 4:
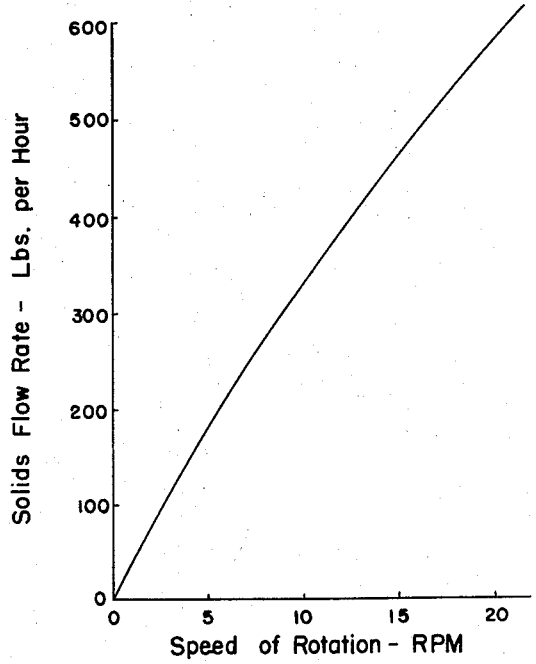

Feb. 3, 1959 T. S. MERTES 2,872,249
APPARATUS AND METHOD FOR CONTROLLING THE RATE
OF FLOW OF SOLID PARTICLES
Filed Oct. 22, 1954 2 Sheets-Sheet 1
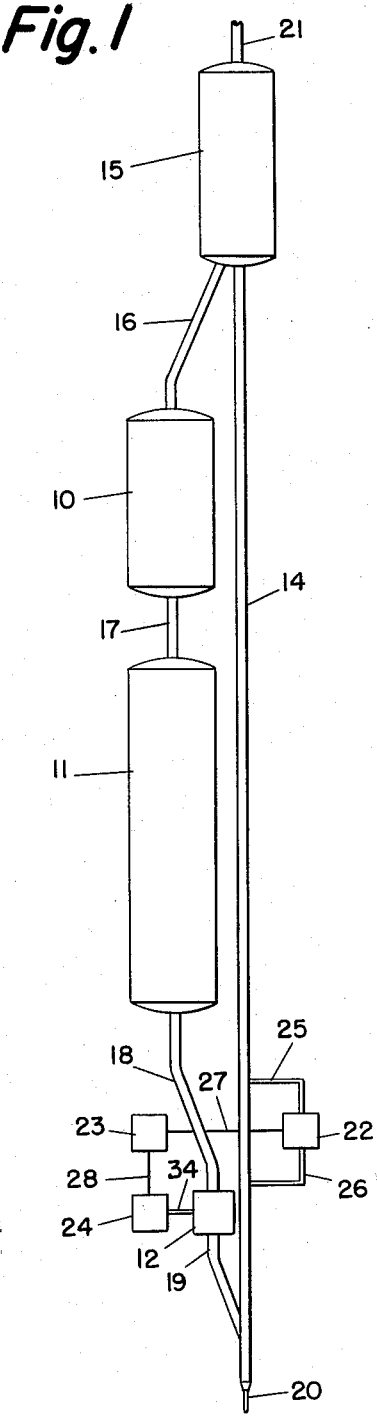
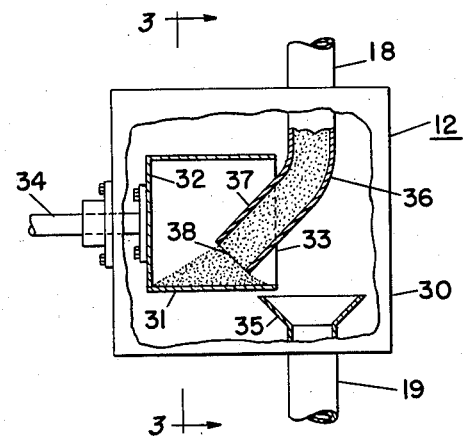
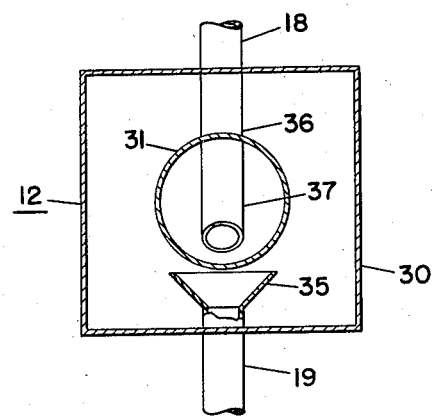
INVENTOR.
THOMAS S. MERTES
ATTORNEY Feb. 3, 1959 T. S. MERTES 2,872,249
APPARATUS AND METHOD FOR CONTROLLING THE RATE
OF FLOW OF SOLID PARTICLES
Filed Oct. 22, 1954 2 Sheets-Sheet 2

*INVENTOR.*
THOMAS S. MERTES
BY
ATTORNEY

2,872,249

APPARATUS AND METHOD FOR CONTROLLING THE RATE OF FLOW OF SOLID PARTICLES

Thomas S. Mertes, Wilmington, Del., assignor to Sun Oil Company, Philadelphia, Pa., a corporation of New Jersey Application October 22, 1954, Serial No. 463,961

14 Claims. (Cl. 302—53)

This invention relates to apparatus and method for controlling the rate of flow of solid particles.

In numerous industrial processes granular solid particles are transported through the process system, and it is frequently necessary to control the rate at which the solids flow through various parts of the system. This is the case for example in the moving bed process for catalytic conversion of petroleum hydrocarbon materials.

Various devices and methods have been proposed for controlling the rate of flow of solid particles, but there are various disadvantages to which the prior art devices and methods have been subject. It is desirable that a solids flow controller should provide a uniform rate of flow and should have low sensitivity through the range of flow rates in which the controller is to operate. Low sensitivity is obtained when the rate of change of flow rate with change of setting of the control mechanism is relatively small, thus permitting smaller increments of flow rate to be obtained by changing the setting.

The present invention provides a solids flow controller which is capable of giving uniform flow rates at a desired flow level, and is also characterized by relatively low sensitivity throughout a substantial range of flow rates, and other advantages.

According to the present invention, granular solids are gravitated from a relatively confined zone onto the inner surface of a hollow baffle, e. g. a horizontal cylindrical baffle, from a position laterally spaced from the inner surface; the baffle is rotated on its axis, and solids pass from the inner surface through an opening in the baffle at a rate which is proportional to the speed of rotation of the baffle; the shortest path from the outlet of the relatively confined zone to the opening in the baffle intersects the baffle at an angle within the approximate range from 20° less than the static angle of repose of the solids to 20° more than the static angle of repose of the solids; for typical solids, this range might be, for example, approximately 10° to 50°; solids are prevented by the baffle from passing from the relatively confined zone directly downwardly to a level beneath the inner surface of the baffle. In one embodiment of the invention, a plurality of openings are provided in the hollow baffle, in order that a proportioning of solids between two effluent streams can be obtained.

Figure 5:
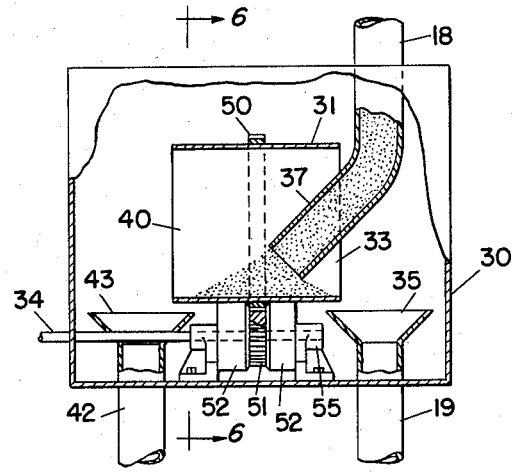
Figure 6:
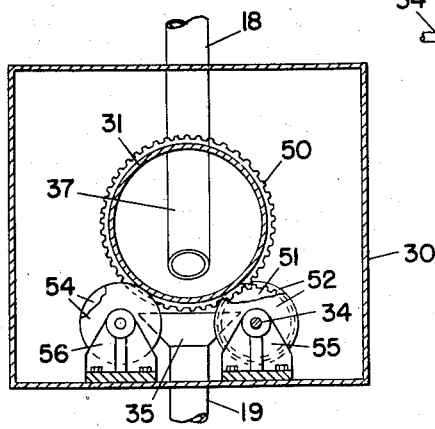

The invention will be further described with reference to the attached drawing. Figure 1 is a schematic diagram of a hydrocarbon conversion system as an example of a system to which the invention can advantageously be applied. Figure 2 is a cutaway elevational view of one form of apparatus according to the invention; and Figure 3 is a sectional end view of the apparatus shown in Figure 2. Figure 4 is a plot of solids flow rate against speed of rotation for one example of operation according to the invention. Figure 5 is a cut-away elevational view of another form of apparatus according to the invention. Figure 6 is the corresponding sectional end view.

In Figure 1 there are shown inter alia a catalytic reaction vessel 10, a catalyst regeneration vessel 11, a solids flow controller 12, a pneumatic lift conduit 14, and a disengager vessel 15. In operation granular solids, e. g. acid-activated clay cracking catalyst particles having particle size generally in the neighborhood of $3/16$ inch, are gravitated from the bottom of the disengager 15 through line 16 into reactor 10, wherein they are contacted with hydrocarbon reactants introduced through means not shown in order to effect chemical reaction of the hydrocarbons. The reaction products are withdrawn from reactor 10 through means not shown, and the granular solids, upon which carbonaceous materials have been deposited during the reaction, are gravitated as a compact mass from reactor 10 through line 17 into regenerator 11. In the latter the solids are contacted with oxygen containing gas introduced through means not shown in order to effect regeneration of the solids by combustion of the carbonaceous deposits. The flue gases are withdrawn from the regenerator 11 through means not shown, and the regenerated solids are passed through line 18 from regenerator 11 into flow controller 12, which will be more fully described with reference to Figures 2 and 3. The solids then pass through line 19 into lift conduit 14 at a rate controlled by the flow controller 12. Lifting gas is introduced into lift conduit 14 through line 20 and carries granular solids upwardly through conduit 14 into disengager 15, wherein lifting gas after separation from solids is withdrawn through line 21. Granular solids are then gravitated through line 16 as a compact mass to begin a new cycle. The other features illustrated in Figure 1 will be described following the discussion of the other figures.

Referring now to Figures 2 and 3, solids flow controller 12 comprises an enclosed housing 30 through the upper wall of which the conduit 18 extends. Within the housing 30 there is positioned a horizontal hollow cylindrical member 31 which is closed at one end by a wall 32 and which has its other end 33 open. A shaft 34 is secured at one end to the wall 32 and extends through the sidewall of housing 30; the shaft 34 is adapted to be driven by driving means not shown in order to rotate cylindrical member 31 about its horizontal axis.

Secured to the lower end of conduit 18 is a pipe bend 36, and secured to the lower end of the pipe bend 36 is a conduit section 37 which is inclined at an angle with the horizontal somewhat greater than the angle of repose. The lower end of conduit section 37 is positioned within the cylindrical member 31. The shortest horizontal distance from the outlet 38 of conduit 37 to open end 33 is preferably not more than about twice the internal major dimension (i. e. diameter in the case of a cylindrical member) of the cross section of the hollow baffle 31 at the open end 33. A straight line between the lowest point of outlet 38 and the lowest point of open end 33 constitutes the shortest path between outlet 38 and the lowest point of open end 33. This shortest path should intersect hollow baffle 31 at an angle of intersection which is not less than about 10°, and preferably not less than about 20°.

In operation granular solids are gravitated through line 18 and conduit section 37 into the cylindrical member 31 and toward the closed end 32 thereof. If the cylindrical member 31 is not rotating, the granular solids form a pile as shown on the inner surface of the sidewall of cylindrical member 31, and do not flow out the open end 33 of cylindrical member 31, since the angle of repose of the solids and the position of conduit section 37 is such as to prevent such flow. However when the shaft 34 is rotated to produce rotation in cylindrical member 31, the solids in the pile are carried upwardly along the inner surface of the side wall of the cylindrical member 31 by frictional forces. The solids, upon being elevated above their static position, are enabled to flow away from closed end 32 of cylindrical member 31 and out the open end 33 thereof, and pass through funnel 35 into conduit 19.

It is preferred according to the invention that the relative positioning of conduit section 37 and cylindrical member 31 be such that no flow of solids occurs through open end 33 when the cylindrical member is stationary. However this is not essential according to the invention since even when there is substantial flow when the cylindrical member is stationary, the flow rate can be increased by rotating the cylindrical member, thus enabling the flow rate to be controlled by the speed of rotation of the cylindrical member.

Referring now to Figure 4, there is presented therein a plot of solids flow rate in pounds per hour against speed of rotation of the cylindrical member 31 in revolutions per minute. The plot was constructed from data obtained with apparatus wherein conduit 18 and conduit section 37 were 2 inch diameter conduits, and cylindrical member 31 had diameter of about 4 inches and length of about 3 inches, the lowest point on the wall of conduit section 37 being positioned about 0.4 inch above the lowest level of the sidewall of cylindrical member 31 and about 0.5 inch from the open end 33 of cylindrical member 31. The solids employed were composed of an acid-activated clay cracking catalyst having for the most part particle size of about 3/16 inch diameter. The plot shows that the solids flow rate was increased from zero pounds per hour to about 627 pounds per hour by increasing the speed of rotation of the cylindrical member from zero R. P. M. to 22 R. P. M. The sensitivity of the solids flow rate to changes in the speed of rotation gradually decreased with increasing speed of rotation and was generally satisfactory throughout the range of speeds employed.

The maximum flow rate of granular solids of the size here employed, through a 2 inch conduit is about 7300 pounds per hour. In order to obtain, with the flow controller according to the invention, a control of the solids flow rate over the entire range between zero pounds per hour and the maximum flow rate, it would be necessary to employ a cylindrical member having greater diameter than that which was employed in the example given above, since the size of the cylindrical member represents a limitation on the amount of solids which can be passed through the controlling device in a unit time.

Referring again to Figure 1, in addition to the apparatus described previously, there are shown schematically a signal-generating device 22, a direct current power supply 23, and a direct current shunt motor 24. Signal-generating device 22 may be any suitable means, e. g. a strain gage, for converting pressure differentials communicated thereto by lines 25 and 26 into electrical signals proportional in intensity to the magnitude of the pressure differential. Lines 25 and 26 are adapted to measure the pressure differential across a portion of the lift conduit 14; any desired portion of the lift conduit, or substantially the entire height of the lift conduit, can be included between the pressure taps.

Power supply 23 may be for example a variable voltage electronic power supply; its voltage output is inversely proportional to the strength of the electrical signal supplied thereto from signal-generating device 22 by line 27. The motor 24 is run by the voltage supplied from power supply 23 by line 28, at a speed proportional to the voltage supplied, thus turning the shaft 34 at a speed proportional to that voltage.

Any other suitable apparatus can be employed for automatically changing the speed of rotation of shaft 34 in response to changes in the pressure differential across the reference portion of lift conduit 14.

In operation, when for any reason the pressure drop in lift conduit 14 becomes undesirably high because of an increase in the amount of solids within the lift conduit, the increase in differential pressure is communicated by means of lines 25 and 26 to signal-generating device 22, in order to reduce the voltage supplied by power supply 23 and consequently the speed of the motor 24 and the speed of rotation of the shaft 34. The rate of solids flow through controller 12 is correspondingly reduced, and the rate of flow of solids into lift conduit 14 is therefore reduced. The concentration of solids in the lift conduit is accordingly reduced in order to restore the desired concentration and the desired pressure in the lift conduit.

In a similar manner, a decrease in pressure drop in lift conduit 14 for any reason results in an increase in the rate of introduction of solids into lift conduit 14 in order to restore the desired pressure differential between lines 25 and 26.

The above description of the use of a flow controller according to the invention in a system as illustrated in Figure 1 is merely illustrative of one of many uses to which the flow controller may be put.

The hollow member employed according to the invention preferably has a substantially horizontal axis. Inclined hollow members can be employed, but the angle with the horizontal must be sufficiently small that the inner surface of the member substantially impedes the downward movement of solids introduced thereonto. Preferably the angle with the horizontal is less than the static angle of repose of the solids on the material of which the hollow member is fabricated, and is more preferably less than about 10°.

Referring now to Figure 5, a modification is shown therein where proportioning of the solids fed to the flow controller between two effluent streams is effected. The cylindrical member 31 has two open ends 33 and 40. Shaft 34 is supported in pillow block 55 and has secured thereto pinion 51 and weight-supporting wheels 52. Gear 50 is secured to the outer wall of member 31 and is adapted to be driven by pinion 51. Weight-supporting wheels 54 are secured to a shaft which is supported in pillow block 56. The weight of cylindrical member 31 is distributed between wheels 52 and 54. The rotation of shaft 34, which is driven by a motor not shown, is transferred by means of pinion 51 and gear 50 to the cylindrical member 31. If desired, an additional gear not shown can be employed, between wheels 54, and meshing with gear 50, in order to avoid frictional wear between wheels 54 and cylindrical member 31.

The conduit section 37 is so positioned that, when the cylindrical member is stationary, the solids form a static pile, as illustrated in Figure 5, on the inner surface of the cylindrical member. The shortest distance between solids in the pile to open end 40 is greater than the shortest distance between solids in the pile to open end 33. As a consequence, when the cylindrical member is rotated, solids issue through open end 40 into pipe 42 at a lesser rate than through open end 33 into pipe 19. Any other desired proportioning of the solids can be obtained by adjusting the position of the conduit section 37, the ratio of the rate of discharge through open end 33 to the rate of discharge through open end 40 being proportional to the ratio of the shortest distance between solids in a static pile to open end 40 to the shortest distance between solids in a static pile to open end 33.

Instead of the open end 40 and driving mechanism as illustrated in Figure 5, a circular plate secured within the left hand end of cylindrical member 31 and secured to a drive shaft can be employed, the plate having slots or other apertures therein constituting an opening through which solids are discharged during operation.

In the apparatus of Figure 5, the cylindrical member 31 can be made movable horizontally in order to vary the relative amounts of solids discharged through the two openings. Thus, if the member 31 is moved to the left, the amount of solids discharged into conduit 19 is increased relative to the amount discharged into conduit 42, and vice versa. The relative amounts of solids discharged through the two openings can also be varied by moving conduit section 37 horizontally. Movement to the left increases discharge into conduit 42, and vice versa. The relative amounts discharged can also be varied by inclining or changing the inclination of cylindrical member 31. Inclination of the member downwardly toward conduit 42 increases discharge into that conduit, and vice versa.

In operation of the apparatus of Figure 5, when one of the effluent conduits is running at its full capacity at a certain speed of rotation, while the other effluent conduit is running at less than full capacity, an increase in speed of rotation causes the flow rate through the latter effluent conduit to increase while the flow rate through the other effluent conduit remains the same.

The apparatus according to the invention can be designed in such a way that there will be, for a given potential rate of solids feed to the flow controller, a minimum, positive rate of discharge from the flow controller, even when the latter is stationary. This may be accomplished by locating the solids supply conduit at such a position that solids flow from it through the opening in the baffle even when the latter is stationary. The angle with the horizontal of the shortest path from the outlet of the solids supply conduit to the opening is in this case greater than the static angle of repose of the solids but should not be more than about 20° greater, since otherwise satisfactory control of the solids flow rate by means of the speed of rotation cannot be obtained. An opening in the hollow member is to be understood as being a discontinuity in the baffle surface through which solids are enabled to pass and move downwardly at an angle with the horizontal greater than their static angle of repose and greater than that of the baffle surface. In Figure 2, the lowest point of the open end 33 of member 31 is regarded as being the opening in the member 31, and the shortest path between the solids supply conduit outlet to the opening is a straight line between that point and the lowest point of outlet 38.

The apparatus according to the invention can additionally, or alternatively, be designed in such a way that there will be, for a given potential rate of solids feed to the flow controller, a maximum rate of discharge from the flow controller, regardless of the speed of rotation. This may be accomplished by making the flow controller dimensions such, relative to the size of the solids supply conduit, that the flow controller has greater capacity than the solids supply conduit. In this case, when the speed of rotation of the flow controller exceeds a certain level, the capacity of the solids supply conduit becomes the limiting factor, providing a maximum which cannot be exceeded.

The funnels 35 and 43 illustrated in the drawings are not essential elements of the apparatus according to the invention, but are useful in directing solids issuing from the hollow member into the effluent conduits. Alternatively, in some cases it may be desirable to construct the housing 30 with an integral sloping floor which converges downwardly into the upper end of the effluent conduit, or in the case illustrated in Figure 5, converges downwardly in two places into the upper ends of the effluent conduits.

The hollow member employed in the apparatus according to the invention may have any suitable shape. Preferably, it has circular cross section, as in the case of a cylindrical member or a member having a conical sidewall, i. e. a conical or frustoconical member.

The method of the invention is applicable generally to particle-form solids which are capable of flowing through conduits and forming piles having a static angle of repose. Examples of such solids are the well-known hydrocarbon conversion catalysts, both natural and synthetic, such as synthetic silica-alumina cracking catalyst, active or activated naturally occurring silicates or hydrosilicates of alumina, etc., the well-known inert conversion-supporting solids such as petroleum coke, refractory pebbles, ceramic balls, etc., adsorbents such as silica gel, clay, etc., sand and other granular solid materials.

The solids whose flow rate is measured according to the invention may be dry, with gas or vapor in the interstices between the particles or, in the case of solids which do not undergo solution, swelling, softening or other adverse change in physical character upon contact with the liquid employed, the solids may contain a liquid in the interstices, provided the solid-liquid mass has a static angle of repose. Examples of solids which can be used where liquid rather than gas occupies the interstices of the solids in the hollow member are sand, silica gel, pebbles, ceramic balls, etc.

The invention claimed is:

1. Apparatus for controlling the rate of flow of solid particles which comprises: a hollow member having a substantially horizontal axis and having a sidewall extending continuously around the axis of said member and providing an inner surface adapted to hinder the downward travel of solid particles introduced thereonto; means for rotating said member about its axis; means for introducing solid particles onto said surface from a position laterally spaced from said surface, said means constituting a conduit which is downwardly inclined toward said inner surface, said hollow member having an opening therefrom, the shortest path from said opening to the outlet of said means for introducing extending downwardly toward said opening and intersecting said inner surface at an angle within the approximate range from 20° less than the static angle of repose of the solids to 20° greater than said static angle, said opening being so positioned that solid particles flow from said means for introducing through said opening at a greater rate when the hollow member is rotated than when it is stationary.

2. Apparatus according to claim 1 wherein the hollow member is cylindrical.

3. Apparatus according to claim 1 wherein said means for introducing comprise a conduit having its axis substantially coplanar with the axis of said hollow member.

4. Apparatus according to claim 3 wherein said hollow member has a closed end and an open end constituting said opening, and wherein solid particles are introduced obliquely toward said closed end.

5. Apparatus according to claim 1 wherein the angle of said intersecting is less than the static angle of repose of the solid particles.

6. Apparatus according to claim 1 and additionally comprising means for automatically changing the speed of rotation of said hollow member in response to changes in conditions in another part of the system through which said solids particles are circulated.

7. Apparatus according to claim 1 wherein said hollow member is cylindrical and has a substantially horizontal axis and two open ends, wherein said means for introducing comprise a conduit whose axis is coplanar with the axis of said member and which is so positioned that solid particles flow from said conduit through both open ends at a greater rate when the hollow member is rotated than when it is stationary.

8. Apparatus according to claim 1 wherein said inner surface is a continuous cylindrical surface.

9. Apparatus for circulating granular solids which comprises: means for gravitating solids as a compact mass through a downflow path; a hollow member having a sidewall extending continuously around the axis of said member and providing an inner surface adapted to hinder the downward travel of said particles introduced thereonto; means for rotating said member about its axis; means for introducing solid particles, after passage through said downflow path, onto said surface from a position laterally spaced from said surface, said hollow member having an opening therefrom, the shortest path from said opening to said outlet intersecting said inner surface at an angle within the approximate range from 20° less than the static angle of repose of the solids to 20° greater than said static angle, said opening being so positioned that solid particles flow from said means for introducing through said opening at a greater rate when the hollow member is rotated than when it is stationary; means for introducing solids, after passage through said opening, into a lift conduit; means for introducing lifting gas into said lift conduit, thereby to elevate solids through said lift conduit; means for introducing solids, after passage through said lift conduit, into said downflow path for gravitation therethrough; and means for automatically changing the speed of rotation of said hollow member in response to changes in pressure drop undergone by lifting gas during passage through at least a portion of said lift conduit, the latter means comprising a motor adapted to run at a speed determined by electrical voltage generated in intensity proportional to said pressure drop.

10. Method for controlling the rate of flow of solid particles which comprises: gravitating a substantially compact mass of solid particles from a relatively confined zone directly onto the inner surface of a hollow baffle having substantially horizontal axis, from a position laterally spaced from said surface, said surface extending continuously around and being spaced apart from the axis of said baffle; rotating said baffle about its axis; and withdrawing solid particles through an opening in said baffle, the shortest path between the outlet of said relatively confined zone and said opening extending downwardly toward said opening and intersecting said inner surface at an angle within the approximate range from 20° less than the static angle of repose of the solids to 20° greater than said static angle, while preventing passage of solids from said confined zone directly downwardly to a level beneath said inner surface, the rate of withdrawal being proportional to the speed of rotation of the baffle.

11. Method according to claim 10 wherein solid particles are withdrawn in two separate streams from opposite ends of said baffle, the rates of withdrawal of at least one of said streams being proportional to the speed of rotation of the baffle.

12. Method according to claim 11 wherein the rates of withdrawal of both streams are proportional to the speed of rotation of the baffle.

13. Method according to claim 10 wherein said inner surface is a continuous cylindrical surface.

14. Method for circulating granular solids which comprises: gravitating solids as a compact mass through a downflow path; gravitating a substantially compact mass of solid particles from a relatively confined zone in said downflow path onto the inner surface of a hollow baffle from a position laterally spaced from said surface; rotating said baffle about its axis; withdrawing solid particles through an opening in said baffle, the shortest path between said outlet and said opening intersecting the inner surface at an angle within the approximate range from 20° less than the static angle of repose of the solids to 20° greater than said static angle, while preventing passage of solids from said confined zone directly downwardly to a level beneath said inner surface, the rate of withdrawal being proportional to the speed of rotation of the baffle; introducing solids, after passage through said opening, into a lifting zone; introducing lifting gas into said lifting zone, thereby to elevate solids through said lifting zone; introducing solids, after passage through said lifting zone, into said downflow path for gravitation therethrough; and automatically changing the speed of rotation of said hollow baffle in response to changes in pressure drop undergone by lifting gas during passage through at least a portion of said lift conduit, such changing being accomplished by driving means adapted to run at a speed determined by electrical voltage generated in intensity proportional to said pressure drop.

References Cited in the file of this patent
UNITED STATES PATENTS

| 2,544,575 | Weber | Mar. 6, 1951 |
| 2,640,731 | Hill | June 2, 1953 |